UNITED STATES PATENT OFFICE.

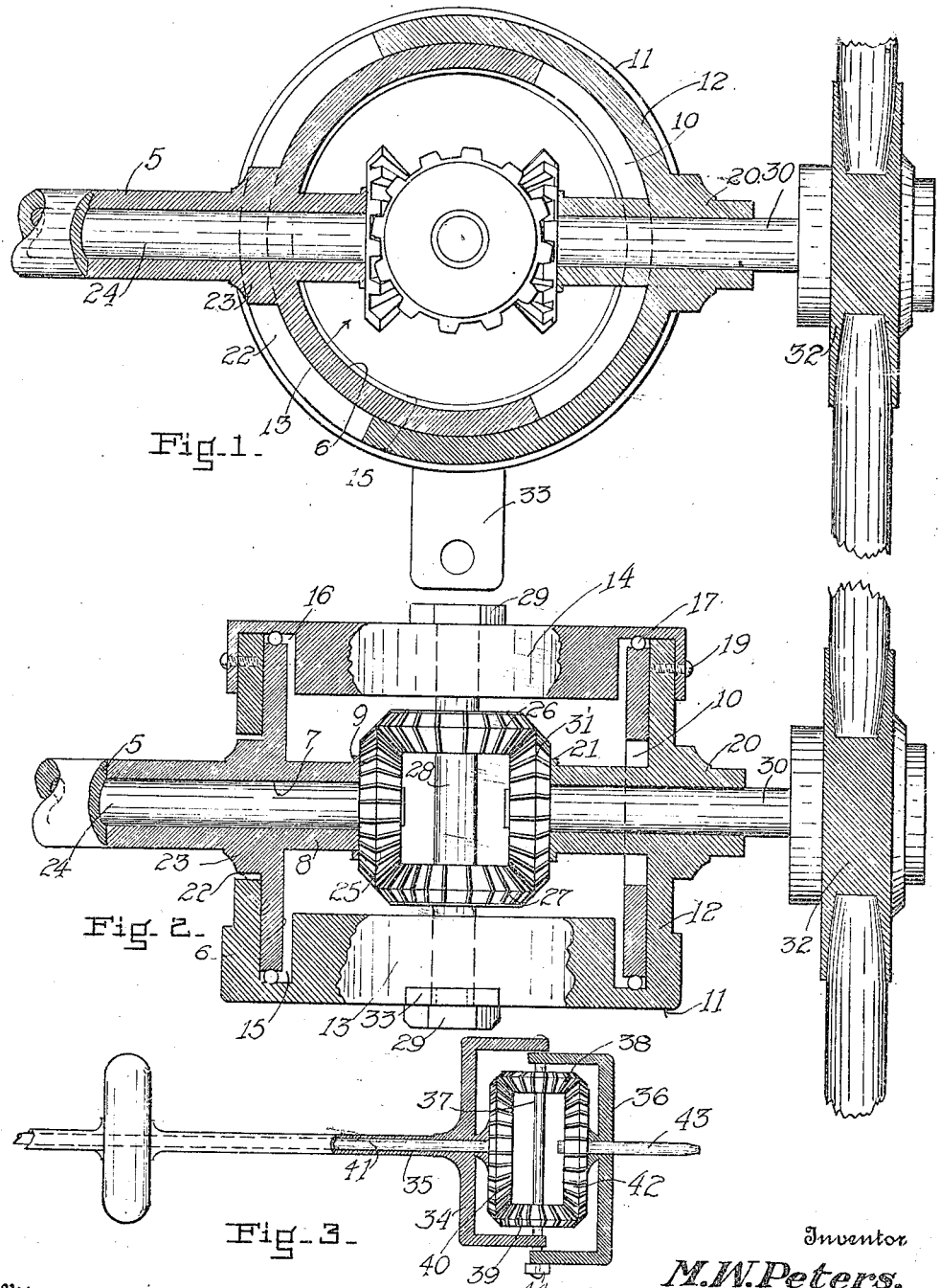

MARCUS W. PETERS, OF LA FAYETTE, NEW YORK, ASSIGNOR OF ONE-HALF TO MORRELL MURPHY, OF MANLIUS, NEW YORK.

WHEEL-DRIVING MECHANISM.

1,141,578. Specification of Letters Patent. Patented June 1, 1915.

Application filed September 5, 1913. Serial No. 788,227.

*To all whom it may concern:*

Be it known that I, MARCUS W. PETERS, a citizen of the United States, residing at La Fayette, in the county of Onondaga and State of New York, have invented certain new and useful Improvements in Wheel-Driving Mechanism; and I do hereby declare the following to be a full, clear, and exact description of the invention, such as will enable others skilled in the art to which it appertains to make and use the same.

This invention comprehends improvements in wheel driving mechanism for motor vehicles and relates more particularly to driving means for the steering wheels so that all of the wheels of a vehicle may be positively driven.

One of the objects of the invention resides in the provision of wheel driving mechanism which is especially adapted for use in connection with automobiles in order that the steering wheels thereof may be positively driven so as to assist in propelling the vehicle.

Another object of the invention is to provide mechanism of this nature which shall be of extremely simple construction, cheap to manufacture, and which is so constructed as to form a casing which will protect the gears from dust and other foreign matter.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a central horizontal sectional view through my improved mechanism, parts thereof being shown in elevation, Fig. 2 is a vertical sectional view, partly in elevation, and, Fig. 3 is a side elevation, showing a modification.

Referring in detail to the drawings by numerals, 5 designates a hollow front axle of a motor vehicle, said axle having a cylindrical shell 6 formed upon each end thereof. The shell is open at its upper and lower ends and projects equal distances above and below the axle 5. It is formed with a transverse opening 7 in alinement with the end of the axle and is also provided with an inwardly extending bearing 8 around said opening 7. The bearing is flanged at its free extremity, as indicated by the numeral 9. The shell is provided upon the side opposite to the bearing 8 with an arcuate or circumferential slot 10, the purpose of which will be hereinafter explained.

A casing, generally designated 11, incloses the shell 6. The casing is formed with an essentially cylindrical body 12, which engages the outer surface of the shell 6, a bottom wall 13 formed integrally with the body 12, and a removable top wall or cover 14. The bottom wall is formed with an annular channel 15 into which the lower end of the shell extends and a cap 14 is formed with a channel 16 into which the upper end of the shell extends. To reduce the friction between the shell and casing 11, anti-friction balls 17 are interposed between the ends of the shell and the casing. The cover may be detachably secured in position by means of suitable screws 19.

The body 12 of the casing is formed with a tubular bearing 20 which projects into the shell below the slot 10 and which also extends outwardly, as clearly shown in the drawings. This bearing is flanged at its inner end, as indicated by the numeral 21. To permit of the casing being rotated about the shell 6, I provide said casing with an arcuate or circumferential slot 22, in which the enlarged portion 23 of the axle 5 works.

A drive shaft 24 extends through the hollow casing 5 and bearing 8 and has rigidly secured to its extremity a bevel gear 25. This gear meshes with similar gears 26 and 27, revoluble around a vertical shaft 28, which extends through the bottom 13 and cap 14 of the casing, and which is rigidly secured in position by suitable nuts 29. A stub axle 30 extends through the bearing 20 and has rigidly secured to its inner end, a bevel gear 31, which meshes with the gears 26 and 29. It will be seen that when the drive shaft 24 is rotated that its motion will be imparted to the stub axle 30 through the medium of the bevel gears so that the wheel 32 secured to the stub axle 30 will be revolved. A steering arm 33 is formed upon the bottom of the casing 11 and when this arm is shifted by any suitable means, the casing will be rotated around the shell 6 and alter the direction in which the vehicle is moving.

It will be seen that the wheel driving mechanism similar to that previously described, is provided at each end of the front axle of a motor vehicle so that each of the steering wheels may be positively driven in such manner as not to interfere with the proper guiding of the vehicle. It will be noted that the shell 6 and casing 11 protect the bevel gears against dirt, dust, and other foreign matter.

In Fig. 3 I have shown a slightly modified form of my invention wherein a U-shaped frame 34 is formed upon each end of the axle 35. A second U-shaped or yoke frame 36 is connected at its extremities to the extremities of the frame 34 by means of a vertical shaft 37, around which the bevel gears 38 and 39 revolve. The gears are driven by means of a bevel gear 40 rigidly secured to a drive shaft 41 and serve to drive a bevel gear 42 to which is connected the stub axle 43. A steering arm 44 is formed upon the frame 36 so that the latter may be swung into various vertical planes.

From the foregoing description taken in connection with the accompanying drawings, it will be apparent that I have provided a very simple wheel driving mechanism which may be employed for the purpose of positively driving the steering wheel of a motor vehicle in such a manner as not to interfere with the proper guidance thereof.

It is to be understood that while I have shown and described the preferred embodiments of my invention, I do not wish to be limited to these exact constructions, combinations, and arrangements of parts, but may make such changes as will fall within the spirit and scope of the invention as claimed.

Having thus described my invention, I claim:—

A wheel driving mechanism comprising a tubular axle, a cylindrical shell open at its upper and lower ends and formed integral upon one end of the axle with its axis arranged in a vertical plane, the shell being formed on its outer side centrally of its ends with a horizontal circumferential slot, a second cylindrical shell surrounding the first mentioned shell and having a circumferential horizontal slot to accommodate the axle, the opposite end walls of the last mentioned slot serving to limit movement of the axle in opposite directions, a top formed on the second mentioned shell and having its main or central portion extended inwardly to provide a circular bearing channel, the upper and lower edges of the first mentioned shell being engaged in said bearing channels, bearing balls positioned in said bearing channels and engaged with the edges of the first mentioned shell, a vertical shaft extending centrally through the bottom and top of the second mentioned shell, a drive shaft extending through the tubular axle and projecting into the first mentioned shell, a stub axle extending through the second mentioned shell and through the slot in the first mentioned shell, beveled gears secured to the opposite ends of the drive shaft and stub axle, and beveled gears loosely mounted upon the vertical shaft and meshing with the first mentioned gears.

In testimony whereof I affix my signature in presence of two witnesses.

MARCUS W. PETERS.

Witnesses:
JOHN O. COLTON,
ADAM WOLBURGER.